US005573356A

United States Patent [19]

Henderson

[11] Patent Number: 5,573,356

[45] Date of Patent: Nov. 12, 1996

[54] FLEXIBLE CARRIER WITH REINFORCING RIBS FOR USE IN AN AIR TUBE CONVEYOR

[75] Inventor: Fraser Henderson, Victoria, Australia

[73] Assignee: Air Tube Conveyors Limited, West Midlands, England

[21] Appl. No.: 181,055

[22] Filed: Jan. 14, 1994

[51] Int. Cl.$^6$ .......... B65G 51/06

[52] U.S. Cl. .......... 406/186; 406/190

[58] Field of Search .......... 406/186, 184, 406/185, 187, 188, 189, 190

[56] References Cited

U.S. PATENT DOCUMENTS

| | | | |
|---|---|---|---|
| Re. 7,503 | 2/1877 | Bailey | 406/184 |
| 299,216 | 5/1884 | Goodwin | 406/189 |
| 3,787,008 | 1/1974 | Barnett et al. | 406/190 |
| 3,888,433 | 6/1975 | Fish | 406/184 |
| 4,240,769 | 12/1980 | Diaz | 406/187 X |

FOREIGN PATENT DOCUMENTS

| | | | |
|---|---|---|---|
| 635190 | 3/1993 | Australia | 406/186 |
| 60-102321 | 6/1985 | Japan | 406/184 |
| 2081200 | 2/1982 | United Kingdom | 406/188 |
| 2118509 | 11/1983 | United Kingdom | 406/184 |

*Primary Examiner*—Andrew C. Pike
*Attorney, Agent, or Firm*—Larson and Taylor

[57] ABSTRACT

A carrier (10) for an air tube conveyor comprises a cylindrical body (11) of flexible material with accelerator rings (25) attached to either end of the body. The accelerator rings (25) comprise a plurality of circular sheets of flexible material secured together across the end of the body. The diameter of the accelerator rings (25) is slightly greater than the internal diameter of he air tube conveyor. Reinforcement is provided by longitudinal ribs (140, 141).

3 Claims, 3 Drawing Sheets

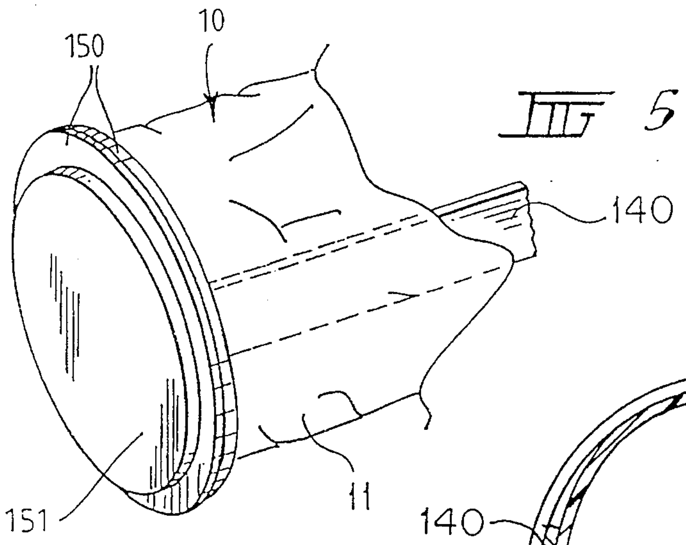
FIG 5
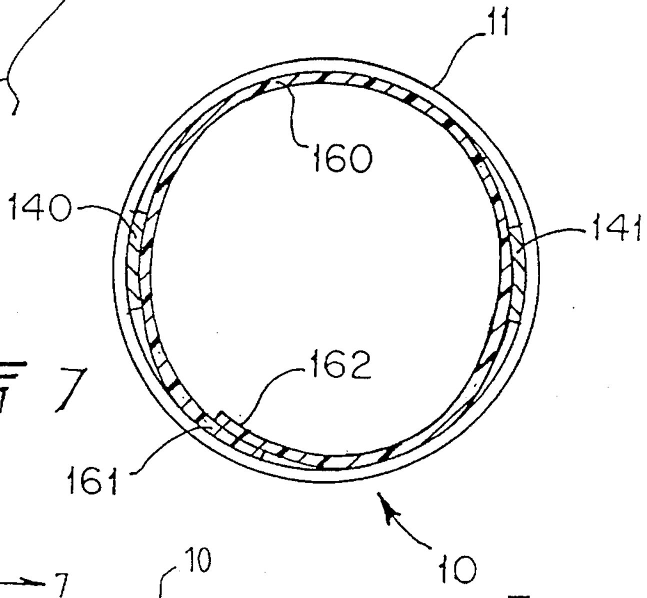
FIG 7
FIG 6
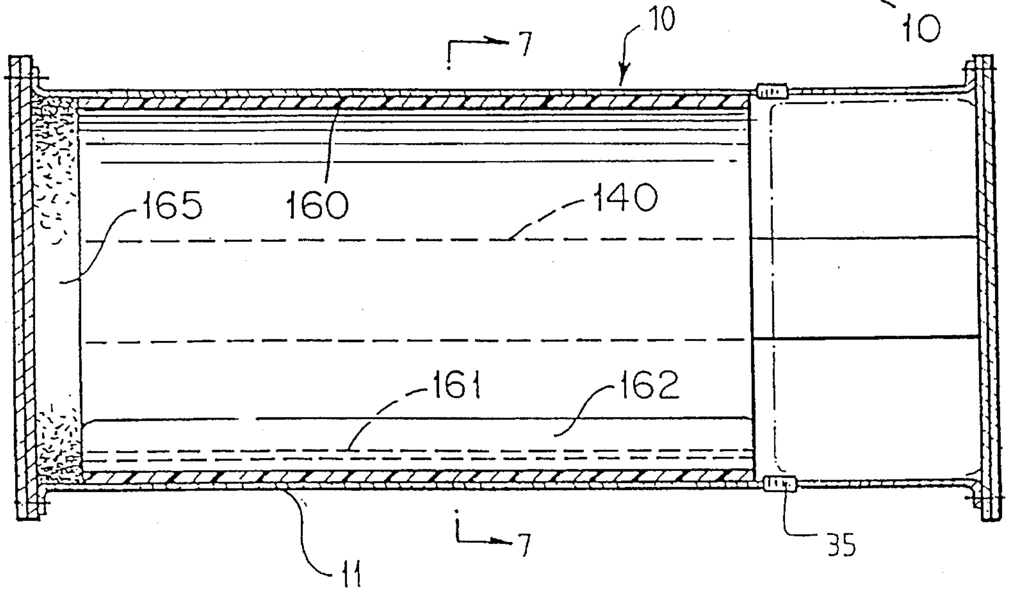

FLEXIBLE CARRIER WITH REINFORCING RIBS FOR USE IN AN AIR TUBE CONVEYOR

FIELD OF THE INVENTION

This invention relates to a carrier for an air tube conveyor.

DISCUSSION OF PRIOR ART

Air tube conveyors form a means of transporting small and comparatively light articles around large buildings. Air tube conveyors are used especially in department stores, supermarkets, industry sampling, and commercial documentation handling. Essentially, air tube conveyors comprise lengths of metal or plastics tube interconnected to extend between designated points. The tube is usually between 63 mm to 350 mm of external diameter. An air blower is used to force air at low pressure along the length of the tube. Such devices also operate on suction.

Carriers in the form of small cylinders that are of approximately the same diameter as the internal diameter of the tube are positioned in the tube and can be blown or sucked along the length of the tube by the air pressure within the tube. Each carrier usually has a cylindrical body that is of smaller diameter than the internal diameter of the tube and a pair of accelerator rings are positioned on each end of the carrier to closely conform with the internal diameter of the tube to reduce the air within the tube flowing past the carrier to improve the efficiency of movement of the carrier along the tube. The elongate body of the carrier is usually provided with a form of closeable aperture whereby items may be positioned within the carrier for transportation.

Carriers for air tube conveyors have proved expensive items and are usually of rigid construction. If the carrier is to be used to transport heavy items such as coins there is a danger that the rigid construction of the carrier causes damage on impact to both the carrier and point of receive due to the momentum of the contents. Stiff accelerator rings suffer from a problem that the ends of the carrier can drop into grooves between adjacent tube sections. Considerable damage can be done to the tubes due to impact damage as the carrier crashes into the end of the conveyor.

The present invention concerns the considered need for a carrier that has a capacity of carry a variety of articles such as coins but is sufficiently resilient to reduce impact damage. A further consideration is that the carrier should be cheaper to produce than known carriers.

SUMMARY OF THE INVENTION

According to the present invention there is provided a carrier for an air tube conveyor comprising a body having a cylindrical side wall and end walls, the body being of flexible material with longitudinally extending spaced reinforcing ribs, at least one end wall of the body comprising at least one circular sheet secured across the side wall of the body and including at least one accelerator ring of flexible material, the diameter of accelerator ring being slightly greater than the internal diameter of the air tube conveyor.

According to the present invention there is further provided a cleaning carrier for an air tube conveyor comprising a hollow body having a cylindrical side wall and end walls, the body being constructed of porous flexible material, a circular sheet of flexible material being secured across at least one end wall to define an accelerator ring of diameter slightly greater than the internal diameter of the air tube conveyor, the hollow body including an access opening allowing the removable insertion of a cylindrical plug of foam material into the interior of the body, whereby forced passage of the body and plug along the air tube has the effect of cleaning the tube.

DESCRIPTION OF THE DRAWINGS

Embodiments of the present invention will now be described by way of example only and with reference to the accompanying drawings in which:

FIG. 5 is a perspective view of one end of another embodiment of carrier, FIG. 6 is across-sectional view of another embodiment of carrier, and FIG. 7 is a cross-sectional view taken along the lines 7—7 of FIG. 6.

DESCRIPTION OF THE PREFERRED EMBODIMENTS

Figure 1:
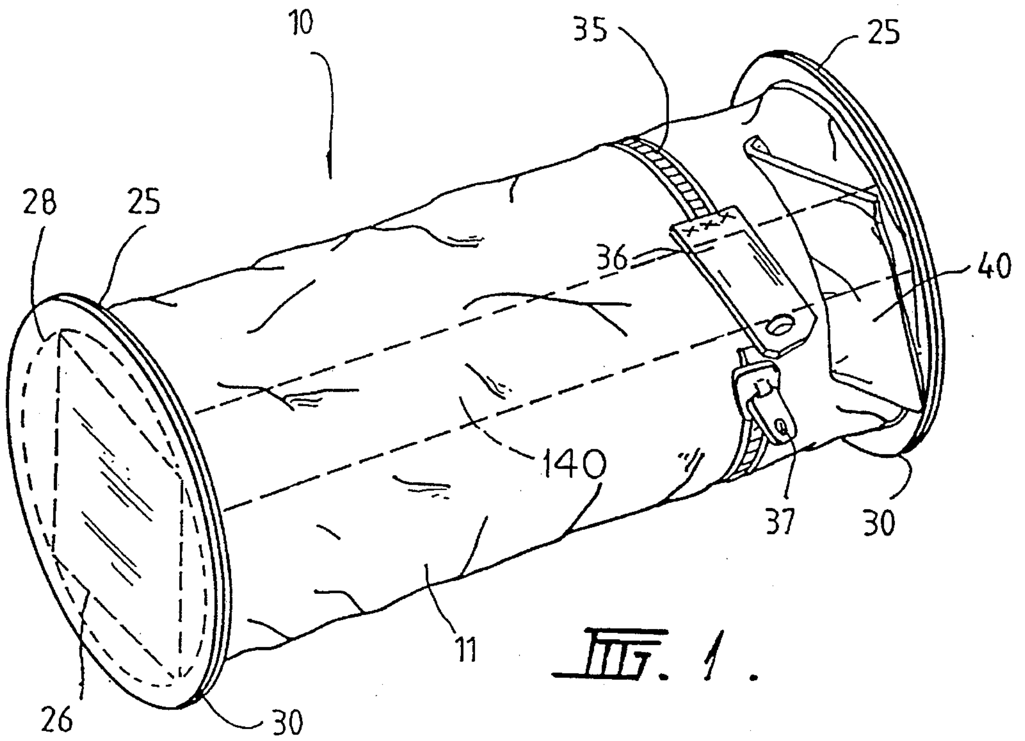
FIG. 1 is a perspective view of a carrier in accordance with one embodiment of the invention.
Figure 2:
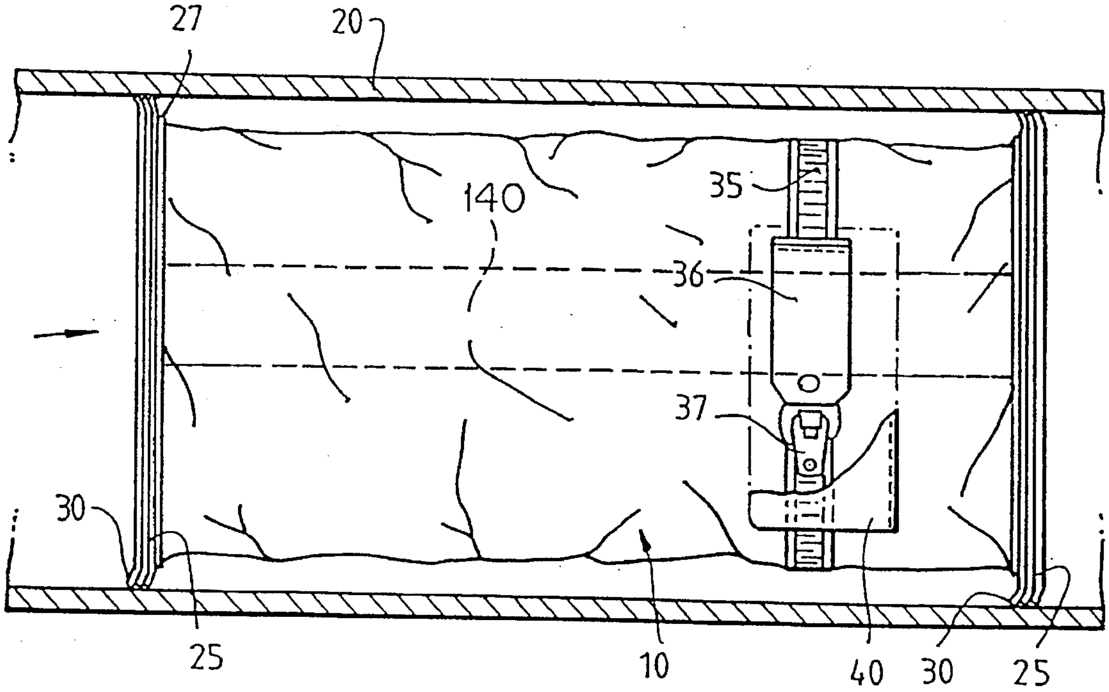
FIG. 2 is a longitudinal cross-sectional view of an air tube conveyor with the carrier inside the tube.

FIG. 1 and 2 illustrate a carrier 10 for an air tube conveyor. The carrier 10 comprises an elongate cylindrical body 11 of flexible canvas material. Although in the preferred embodiments the body 11 is of canvas, it is understood that other similar materials such as flexible vinyl are equally suitable. The diameter of the cylindrical body 11 is engaged to be some millimeters less than the internal diameter of the air tube 20 that is shown in FIG. 2 to enable the carrier to pass unhindered around bends.

Each end of the carrier comprises three circular sheets 25 of flexible, heavy duty PVC with nylon base cloth interwoven material stitched together through a square array of stitching 26 and the stitched-to down-turned edges 27 of the canvas body 11 with a circular array of stitching 28. The diameter of the vinyl and sheets 25 is slightly greater than the internal diameter of the air tube 20 so that as shown in FIG. 2 as the carrier 10 operates within the tube 20 the annular lip 30 defined by the end sheets 25 is folded back on itself as the carrier 10 moves along the tube 20 in the direction of the arrow of FIG. 2. The flexible lip 30 reduces the airflow past the carrier and thus defines accelerator rings enhancing the efficiency of movement of the carrier within the tube.

The body 11 of the carrier 10 is also provided with an arcuate opening closed by a zipper 35 that runs around the majority of the circumference of the body 11 to allow ready access to the tube interior. The end pieces 36 and 37 of the zipper 35 can be interconnected by a locking device (not shown) for security purposes. A small flap 40 is stitched to the body 11 of the carrier adjacent the end pieces of the zipper, and as shown in FIG. 2, this flap 40 can be folded down onto the locked zipper to ensure that the metal components of the zipper do not engage the interior surface of the tube longitudinal strength when empty, a pair of elongate longitudinal reinforcing ribs (only one of which, denoted 140, can be seen in FIGS. 1 and 2) are stitched to the interior surface of the carrier. The ribs, which are more clearly seen in FIGS. 3 and 4 and are denoted 140 and 141 in FIG. 4, comprise rectangular strips of plastics.

Figure 3:
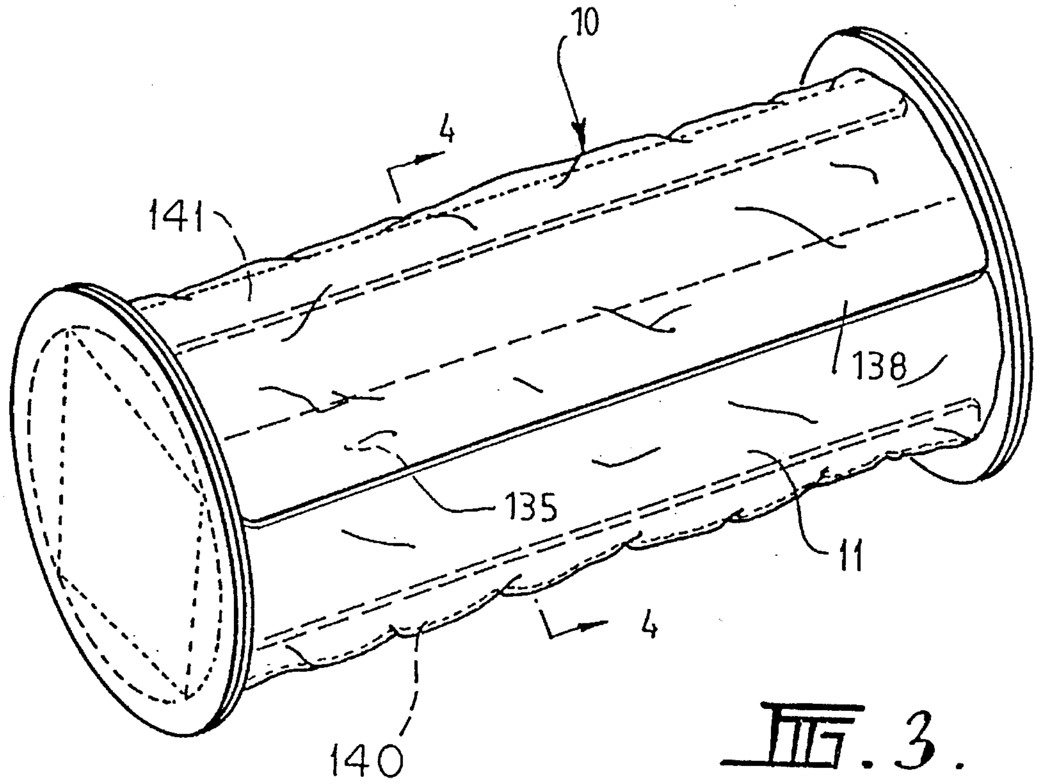
FIG. 3 is a perspective view of a carrier in accordance with a second embodiment.
Figure 4:
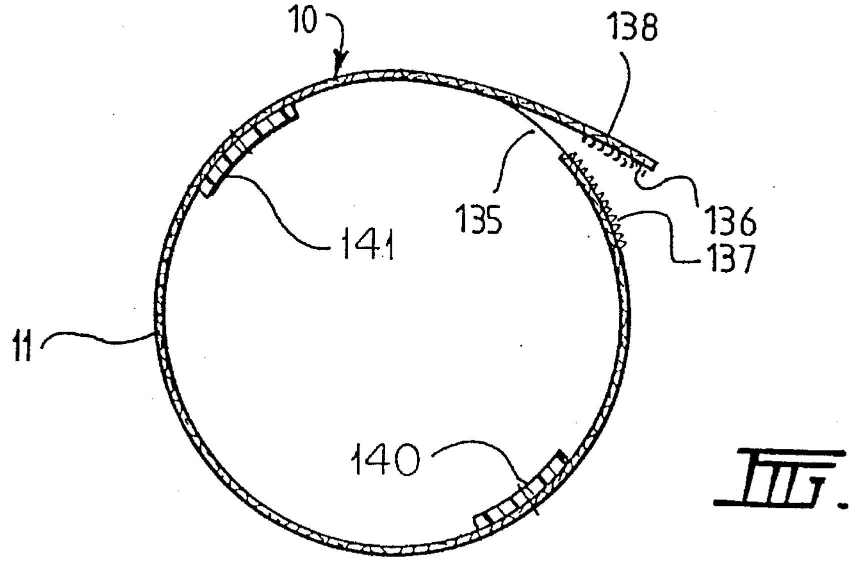
FIG. 4 is a cross-sectional view taken along the lines 4—4 of FIG. 3.

As shown in the embodiment illustrated in FIG. 3, the carrier 10 is provided with a longitudinally extending aperture 135 in its periphery which is closed by hook and loop fastening elements 136 and 137. The hooks 136 are positioned on a flap 138 that extends over the elongate aperture 135 to close the aperture. This feature is shown in more detail in FIG. 4.

In the embodiment shown in FIG. 5, the ends of the carrier are defined by two circular sheets 150 of PVC which are attached to a thicker and heavier and non-flexible disc 151 of diameter that is slightly smaller than the diameter of the body of the carrier. The sheets 150 of PVC defines the circular lip or accelerator ring and the heavy plastics disc 151 gives the end of the carrier form and a degree of rigidity. It is also understood that in some embodiments the three sheets may be replaced by two sheets or two sheets with a reinforcing disc of heavier cross section. Whilst in the preferred embodiment the componentry is stitched together as shown in FIGS. 1 and 2, it is understood that adhesives or other securing means may be used to secure the sheets together.

Where the carrier is to be used for transporting coins there is sometimes a need to provide further reinforcement for the carrier and this is carried out by the provision of a lightweight plastics sleeve 160 with overlapping ends 161 and 162 that cause the sleeve to form a substantially cylindrical format within the interior of the sleeves. The overlapping ends provide versatility and allow a degree of compressibility of the sleeve as shown in FIG. 7. As a further means of preventing damage to the ends of the carrier it is understood that foam pads 165 may be provided at either end of the carrier between the ends of the reinforcing sleeve 160 and the ends of the carrier.

The carrier due to its inherent flexibility when empty, can be folded to assume a very small volume for external transportation. The carrier is specifically designed for use in supermarkets where cash can be distributed by the carrier to the tills along an air tube conveyor. The carrier is designed to carry up to 4 kg of coins. The carrier serves as a vehicle for transport of coins within the tube and as a secure means to store the cash in safes or vaults. The size of the interior of the carrier is such that the carrier cannot be overloaded with coins and the lack of rigid componentry ensures that when the carrier is in motion there is less likelihood of impact damage. The multi-layered flexible accelerator rings allow it to operate satisfactorily with a heavy load and also overcome the problem of the end portions dropping into gaps between adjacent tube sections.

The carrier of this invention allows an air tube conveyor system to deliver into a receiving station without the essential need for any form of damping or slowing device designed to reduce impact and impact damage. The invention also permits the size of the carrier to be changed without the major cost of sophisticated tooling to suit specific customer applications. The use of a flexible body to form the carrier allow the carrier to travel around smaller radius bends than those achievable with conventional rigid carriers. It is understood that the closure method of the carrier need not necessarily be a zip, other closure methods include use of hook and loop fasteners, pull cord/drawstring, and press studs.

The increased pressure differential caused by the carrier described about renders the carrier capable of running at higher speeds than a conventional carrier and is capable of carrying a heavier load. This is due to the quality of the fit of the carrier within the tube. The flexibility of the carrier also facilitates greater carrying capacity.

Many modifications fall within the scope of this invention such as the means of securing the end plates to the carrier body. Then umber of end plates may also vary as may the material from which they are made.

The body of the carrier may also include one or more wearer rings extending longitudinally spaced externally of the body. These rings reduce the frictional wear on the carrier body.

In the embodiments described above the flexible material of the carrier body and accelerator rings is impervious. However, in a further embodiment the carrier may be manufactured from porous material and is filled with a plug of foam plastics. The carrier can then be impregnated in a suitable disinfectant and passed along the air tube to clean the conveyor. This application is particularly useful in hospitals and medical environments.

Having now described my invention What I claim is:

1. A carrier for an air tube conveyor having an internal diameter, said carrier comprising a body having a cylindrical side wall and end walls, the body being of a flexible material with longitudinally extending spaced reinforcing ribs, at least one end wall of the body comprising at least one circular sheet secured across the side wall of the body and including at least one accelerator ring of flexible material, the at least one accelerator ring having a diameter slightly greater than the internal diameter of the air tube conveyor, each end wall comprising a disc of substantially non-flexible material secured to at least one larger disc of flexible material, and the at least one larger disc having a periphery defining the accelerator ring.

2. A carrier according to claim 1 wherein the non-flexible disc is secured to two larger discs of flexible material.

3. A carrier according to claim 1 wherein the side wall is provided with an access opening and means to open and close the opening.

* * * * *